Aug. 16, 1932.  J. HUDSON  1,871,526
SEPARATOR
Filed May 24, 1928
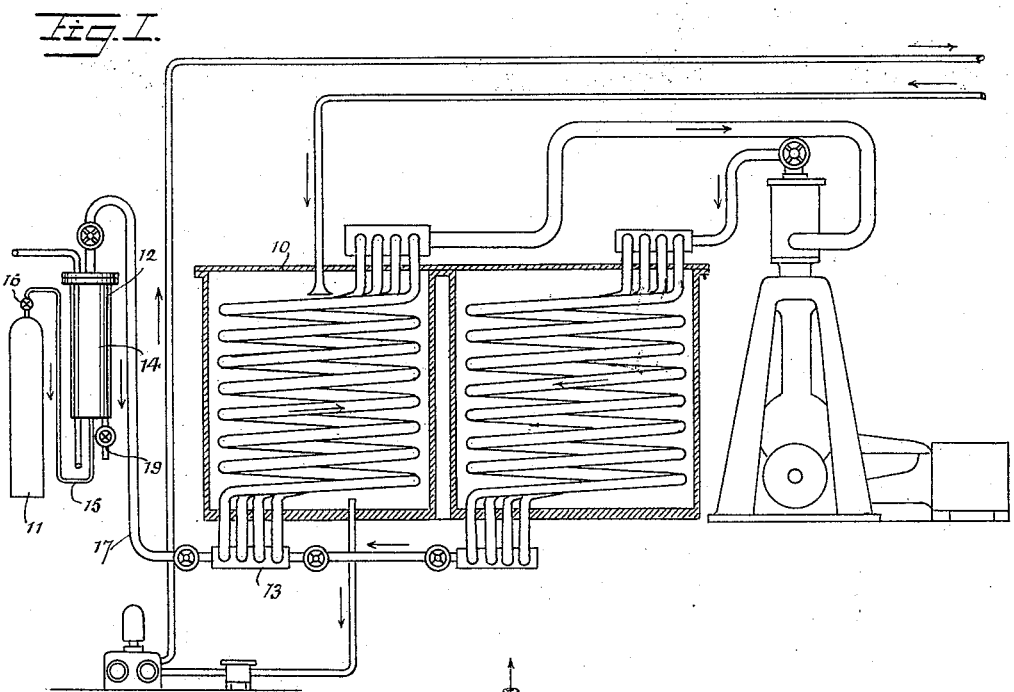
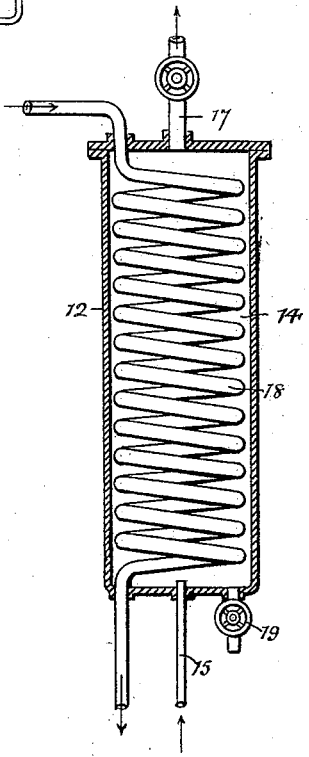
INVENTOR
John Hudson Patented Aug. 16, 1932

1,871,526

UNITED STATES PATENT OFFICE

JOHN HUDSON, OF BROOKLYN, NEW YORK

SEPARATOR

Application filed May 24, 1928. Serial No. 280,281.

This invention relates to a device in the form of a separator to be used for charging a refrigerating apparatus from containers of refrigerant.

All commercial $CO_2$ (carbon dioxide) gas which is supplied for refrigerating purposes contains a large percentage of water. Up to the present time no effective method has been discovered for extracting this water from the gas before the gas is admitted into the evaporator or expansion coils of the refrigerating apparatus. The temperature of these coils under normal operation is much below freezing and the water or water vapor on being admitted to the coils becomes frozen and is generally deposited on the inside of the coils in the form of snow or ice thereby insulating them, or lodges in the bottom of the coils near the manifold connection and results in choking up the system and often putting the refrigerating apparatus entirely out of operation.

The detrimental effects of this condition are intensified by the fact that the water admitted comes in contact with the oil used for the lubrication of the internal parts of the apparatus and on being agitated forms an emulsion of oil and water which is very hard to break down, and is very effective in choking and insulating the coils. Some expedients such as introducing pure alcohol, etc., are resorted to with a view to clearing the coils, but are not very effective, the only successful way being to heat up the refrigerant on the outside of the coils to a sufficient temperature so as to separate the oil and water thereby breaking down the emulsion when the objectionable matter may be blown out, the temperature necessary is from 150° to 200° F., and at least twenty-four hours is required during which period the apparatus would be out of operation.

The refrigerant in a liquid state is contained in flasks or bottles, which are connected with the intake of the evaporator or expansion coils of the refrigerating apparatus in order to charge the same. It has been the practice to turn each flask or bottle upside down, to allow the water to settle, and then draw as much of the water as possible off through the valved conduit which is connected with the top of the flask or bottle. Inasmuch as the specific gravity of the liquified gas refrigerant and water are almost the same, the settling process is very slow, and when resorted to is very ineffective. The use of certain types of separators has been resorted to for the purpose of eliminating water from the refrigerant, but have been found to be inadequate to carry out the result looked for.

The present invention contemplates a device designed and adapted to be used for separating or extracting water from a liquid refrigerant, such as carbon dioxide, by bringing the same into contact with cold surfaces while it is being admitted to the cooling unit or evaporator coils of a refrigerating apparatus and thus congealing or freezing the water, or in other words to form ice or snow, in a chamber or receptacle. In this way water contained by the refrigerant is separated or extracted and thereby prevented from entering the system of a refrigerating apparatus, with the refrigerant, during the charging operation.

The nature of the invention and its distinguishing features and advantages will appear when the following specification is read in connection with the accompanying drawing, in which—

Figure 1 is a diagrammatic view of a refrigerating apparatus, conventionally shown, and a separator constructed in accordance with the present invention in use.

Fig. 2 is a sectional view through the separator.

Referring now more particularly to the drawing it will be apparent that, in Fig. 1 there is shown a common type of refrigerating apparatus, which is conventionally illustrated. It is sufficient to merely mention one of the evaporators 10 of the apparatus for a full understanding of the application of the invention. When charging the apparatus with a supply of refrigerant, such as commercial $CO_2$ (carbon dioxide), such refrigerant in a liquid state is admitted to the expansion coils of one of the evaporators.

As before stated the refrigerant is contained in a flask or bottle which is indicated at 11 in Fig. 1. In accordance with the invention use is made of a device 12 which is designed and adapted to be connected with the flask or bottle 11 and an intake of a manifold 13 connected with the coils of the evaporator 10. The said device 12 includes a container body or receptacle 14 which is provided at one end with a conduit 15. The free end of the conduit 15 is provided with a suitable fitting for the purpose of making detachable connection with the valved outlet 16 of the flask or bottle 11. The opposite end of the receptacle 14 is provided with a valved conduit 17 adapted to be detachably connected with the intake of the manifold 13. Arranged within the receptacle 14 is a coil 18 one end of which is connected with a suitable supply of cold brine, and the opposite end of which is connected with a suitable discharge line. The lower end of the receptacle 14 is provided with a valved drain 19. It will now be understood that when the device 12 is properly connected with the flask or bottle 11, and also with the manifold 13 of the evaporator coils, the refrigerant, which is under considerable pressure passes from the flask or bottle 11 through the receptacle 14 in the presence of the surfaces presented by the coil 18, and then through the conduit 17 into the expansion coils of the evaporator 10, through the manifold 13. Cold brine is circulated through the coil 18, and as a consequence any water in the refrigerant or liquified gas will be congealed on the surfaces presented by the coil 18 and receptacle 14, thus separating or extracting any water present in the refrigerant, which will enter the refrigerating apparatus free of any water. The congealed water, which is in the form of snow or ice, may be melted by applying heat to the receptacle 14, and the resulting water may then be readily drawn off by opening the valve in the drain 19.

In cases where there is no secondary refrigerating means and cold brine is not obtainable, the $CO_2$ gas or like refrigerant may be allowed to expand in the system of a refrigerating apparatus, and in this way, a large percentage of the water or moisture will be collected in the receptacle 14 of the separator, which can be drawn off through the drain 19.

I claim:

1. The combination with a refrigerating apparatus; of a device for charging said apparatus from a container of refrigerant adapted to be connected with the apparatus and also with said container, said device serving for the purpose of separating or extracting any water content of the refrigerant during charging, said device including means having freezing surfaces, and means for conducting the refrigerant in the presence of said surfaces for the purpose of freezing the water which will be deposited thereon in the form of snow or ice.

2. The combination with a refrigerating apparatus including an evaporator; of a device for charging said apparatus from a container of refrigerant adapted to be connected with the evaporator and also with said container, said device serving for the purpose of separating from the refrigerant any water contained therein, while being admitted to said evaporator from the container, said device including means on which the water is caused to congeal, to thus separate the water from the refrigerant.

3. A device for charging a refrigerating system from a flask of refrigerant comprising a container body provided with an inlet and an outlet, said inlet and outlet being adapted for connection with the flask and system respectively, said body also having a drain, and a freezing coil arranged within said body.

4. A device for charging a refrigerating system from a container of refrigerant comprising a casing, a freezing coil arranged within said casing, said casing being provided with means for circulating a liquid refrigerant from the container through said casing in the presence of said coil for the purpose of freezing any water in the refrigerant to cause it to be deposited on said coil in the form of snow or ice, and said casing also being provided with means for drawing off the water accumulating from the melted snow or ice.

5. The combination with a refrigerating apparatus having an intake for a liquid refrigerant; of a charging device adapted to be connected with said intake and also with a container of the liquid refrigerant, said device including a container body through which the refrigerant passes when being admitted to said apparatus through said intake, and freezing means extending within said body for the purpose of congealing any water or moisture in the refrigerant.

Signed at New York in the county of New York and State of New York this 21st day of May, A. D. 1928.

JOHN HUDSON.